(12) United States Patent
Murakami et al.

(10) Patent No.: US 6,250,111 B1
(45) Date of Patent: Jun. 26, 2001

(54) LINING MATERIAL FOR GLASS MELTING FURNACES, GLASS MELTING FURNACES, PROCESS FOR PRODUCING GLASS PRODUCTS, AND PROCESS FOR PURIFYING THE LINING MATERIAL

(75) Inventors: Tsugunobu Murakami; Tadakazu Hidai, both of Yokkaichi (JP)

(73) Assignee: NH Technoglass Co., Yokohama (JP)

( * ) Notice: Subject to any disclaimer, the term of this patent is extended or adjusted under 35 U.S.C. 154(b) by 0 days.

(21) Appl. No.: 09/203,245

(22) Filed: Dec. 1, 1998

(30) Foreign Application Priority Data

Apr. 27, 1998 (JP) ................................................. 10-117277
Oct. 13, 1998 (JP) ................................................. 10-291182

(51) Int. Cl.[7] ................................................. C03B 5/225
(52) U.S. Cl. ...................... 65/134.9; 65/135.2; 65/374.12
(58) Field of Search ................. 65/90, 134.1, 134.9, 65/135.2, 374.12, 474, 492, 493, 193, 258; 420/466–468

(56) References Cited

U.S. PATENT DOCUMENTS

| | | | |
|---|---|---|---|
| 3,622,289 | * 11/1971 | Hansen et al. | 65/492 |
| 3,773,482 | * 11/1973 | Hansen et al. | 65/493 |
| 3,779,728 | * 12/1973 | Hansen et al. | 65/493 |
| 4,342,577 | * 8/1982 | Bhatti et al. | 65/493 |
| 5,342,426 | * 8/1994 | Dumbaugh, Jr. | 65/23 |
| 5,824,127 | * 10/1998 | Bange et al. | 65/90 |

FOREIGN PATENT DOCUMENTS 51-62564  11/1974 (JP).
7-10546   6/1993 (JP).

OTHER PUBLICATIONS

Hamada, et al., "High–Temperature Creep of Pure Platinum", *Materials Transactions*, JIM, vol. 37, No. 3, pp. 353–358, 1996. (No month available).

Hamada, et al., "Grain Size Dependence Of Steady–State Creep Rate Of Pure Platinum And Its Alloys", THERMEC'97, *The minerals, Metals & Materials Society*, pp. 1647–1648, 1997. (No month available).

Tanaka, et al., "Tanaks's Refined Platinum Articles", *Catalog 1*, pub. Mar. 12, 1987.

Tanaka, et al., "Tanaks's Refined Platinum Articles", *Catalog 2*, pub. Apr. 5, 1995.

D. Böttger "Platineinsatz bei der Herstellung von optischem sowie Gebrauchs–Glas" ("The Use of Platinum in the Production of Optical and Utility GlasseS") *Sprechsaal*, vol. 118, No. 5, pp. 411–415. (No month available).

* cited by examiner

*Primary Examiner*—Sean Vincent
(74) *Attorney, Agent, or Firm*—Merchant & Gould P.C.

(57) ABSTRACT

A lining material for glass melting furnaces comprises platinum or platinum alloy as a base material containing osmium as an impurity in an amount no more than 20 ppm. The lining material is used for that part of the melting furnace which comes into contact with molten glass. The low osmium content prevents the formation of bubbles in molten glass, thereby providing high-quality glass products.

17 Claims, 5 Drawing Sheets

LINING MATERIAL FOR GLASS MELTING FURNACES, GLASS MELTING FURNACES, PROCESS FOR PRODUCING GLASS PRODUCTS, AND PROCESS FOR PURIFYING THE LINING MATERIAL

BACKGROUND OF THE INVENTION

1. Field of the Invention

The present invention relates to a lining material for glass melting furnaces, which is composed mainly of platinum or platinum alloy, a process for purifying the lining material, a glass melting furnace lined with the lining material, and a process for producing glass products.

2. Description of the Related Art

Glass is defective if it contain stones, cords, and bubbles. Stones are crystalline bodies of minerals, and they adversely affect the transparency and strength of glass. Cords are streaky amorphous bodies, and they adversely affect the refractive index of glass, distorting the image passing through glass. Bubbles also adversely affect the transparency of glass. Particularly, bubble wreckage on the surface of an LCD (liquid crystal display) substrate causes open circuits. Therefore, LCD glass plates and optical lenses should be free of the above-mentioned defects.

It is known that stones result from fine powder of refractory material when glass is melted in a melting furnace lined with refractory material, that cords result from refractory material dissolved in glass, and that bubbles result from refractory material in contact with glass. One way to prevent stones and cords is by lining with platinum or platinum alloy. One way to prevent bubbles is by incorporation of a fining agent into raw glass materials.

The above-mentioned measures are successful to a certain extent. Even a few bubbles are not tolerable for electronic glass (such as LCD glass). Complete elimination of bubbles is impossible even in the case of lining with industrial platinum of high purity (99.95 wt %), with the remainder (0.05 wt %) being unavoidable impurities. Countermeasures against bubbles are indispensable for further improvement in glass quality.

Despite their thorough investigation into production facilities involved, the present inventors were unable to pinpoint the source of bubbles. They assumed that the major source of bubbles is platinum in contact with molten glass.

It was found that industrial platinum in actual use varies in residual impurities depending on its origin and production lot and on whether or not it contains recycled platinum. An example of analytical data is given below.

TABLE 1 impurities in industrial platinum

| Impurities | Content |
|---|---|
| Palladium (Pd) | 5–13 ppm |
| Rhodium (Rh) | 20–40 ppm |
| Iridium (Ir) | 0–13 ppm |
| Osmium (Os) | 30–84 ppm |
| Arsenic (As) | 4–14 ppm |

Palladium (Pd) is a stable element and is unlikely to cause bubbles. Rhodium (Rh) is an element added to increase the strength of platinum and is also unlikely to cause bubbles. Osmium (Os) is liable to oxidation, giving rise to an oxide which vaporizes at a low temperature. In view of this and its high content, osmium is very likely to cause bubbles. Iridium (Ir) is oxidized at 800° C. and above (although not so easily as osmium) and vaporizes at 1000° C. and above. However, in view of the fact that iridium has long been used as a material for glass melting crucibles, iridium is unlikely to cause bubbles. Arsenic (As) vaporizes easily or oxidizes easily to form volatile oxides. However, it readily dissolves in glass and hence is unlikely to cause bubbles.

Accordingly, the present inventors have experimentally studied the relation between the amount of osmium and the number of bubbles. It turned out that the lower the content of osmium, the less the number of bubbles. This finding led to the present invention.

SUMMARY OF THE INVENTION

According to a first aspect of the present invention, there is provided a lining material for glass melting furnaces, which comprises platinum or platinum alloy as a base material containing osmium as an impurity in an amount no more than 20 ppm.

Limiting the content of osmium as above is effective in reducing the number of bubbles evolving from the lining material and entering the molten glass. For high-quality glass, the content of osmium should preferably be no more than 10 ppm.

According to a second aspect of the present invention, there is provided a glass melting furnace which is lined, at least at a part thereof in contact with molten glass, with a lining material for glass melting furnaces. The lining material comprises platinum or platinum alloy as a base material containing osmium as an impurity in an amount no more than 20 ppm.

Lining the glass melting furnaces with the lining material containing osmium as an impurity in an amount no more than 20 ppm reduces the number of bubbles entering the molten glass. For high-quality glass, the content of osmium should preferably be no more than 10 ppm.

In one preferred form, the glass melting furnace comprises a melting tank in which glass raw materials are melted, a refining tank in which molten glass undergoes a fining treatment, and a forming unit in which molten glass is drawn and formed into sheet glass. At least the forming unit is lined with the lining material. The forming unit in which molten glass is formed into sheet glass should be free of bubbles. Since the lining material does not evolve bubbles, the forming unit permits the production of a bubble-free, high-quality sheet glass.

In another preferred form, the glass melting furnace further comprises a rear facility for homogenizing, mixing, and forming defoamed molten glass. The rear facility may also be lined with the lining material.

Desirably, the refining tank is also lined at least partially with the lining material.

According to a third aspect of the present invention, there is provided a process for producing glass products, which comprises the steps of: refining molten glass in a refining tank; homogenizing the molten glass from the refining tank at a predetermined uniform temperature in a homogenizing tank; and forming the molten glass from the homogenizing tank into a sheet glass in a forming unit. The refining tank is lined, at least at a wall thereof in contact with the molten glass, with a lining material for glass melting furnaces, which material comprises platinum or platinum alloy as a base material containing osmium as an impurity in an amount no more than 20 ppm, so that the wall evolves no bubbles during refining. The homogenizing tank is lined, at least at a wall thereof in contact with the molten glass, with a lining material for glass melting furnaces, which material comprises platinum or platinum alloy as a base material containing osmium as an impurity in an amount no more than 20 ppm, so that the wall evolves no bubbles during homogenization. The forming unit is lined, at least at a wall thereof in contact with the molten glass, with a material for glass melting furnaces, which material comprises platinum or platinum alloy as a base material containing osmium as an impurity in an amount no more than 20 ppm, so that the wall evolves no bubbles during forming.

Bubble-free high-quality glass products can be obtained since refining, homogenizing, and forming steps are performed in the facilities lined with the lining material containing osmium in an amount no more than 20 ppm.

In one preferred form, the process further comprises the step of melting glass in a melting tank prior to the refining step. The melting tank may desirably be lined, at least at a wall thereof in contact with the molten glass, with a lining material for glass melting furnaces, which material comprises platinum or platinum alloy as a base material containing osmium as an impurity in an amount no more than 20 ppm, so that the wall evolves no bubbles during melting.

In another preferred form, the process further comprises the step of mixing the molten glass in a mixing tank prior to the forming step. The mixing tank is desirably lined, at least at a wall thereof in contact with the molten glass, with a lining material for glass melting furnaces, which material comprises platinum or platinum alloy as a base material containing osmium as an impurity in an amount no more than 20 ppm, so that the wall evolves no bubbles during mixing.

Since each step of the process is carried out in the facilities lined with the lining material containing osmium in an amount no more than 20 ppm, bubble-free, high quality glass products can be obtained. More desirably, the osmium content in the lining material is reduced to less than 10 ppm so that glass products of higher quality can be obtained.

According to a fourth aspect of the present invention, there is provided a process for purifying a lining material for glass melting furnaces, which comprises the steps of providing osmium-containing platinum or platinum alloy, and keeping the osmium-containing platinum or platinum alloy at a temperature higher than a temperature at which osmium oxide vaporizes, for a predetermined period of time, so that the content of osmium decreases to 20 ppm or less at least in a surface or its vicinity of the platinum or platinum alloy.

The osmium content exceeding 20 ppm can be reduced by keeping the platinum or platinum alloy at 1700° C. for hundreds of hours.

BRIEF DESCRIPTION OF THE DRAWINGS

Certain preferred embodiments of the present invention will hereinafter be described in detail, by way of example only, with reference to the accompanying drawing, in which.

DETAILED DESCRIPTION OF THE PREFERRED EMBODIMENTS

The following description is merely exemplary in nature and is in no way intended to limit the invention or its applications or uses.

Figure 1:
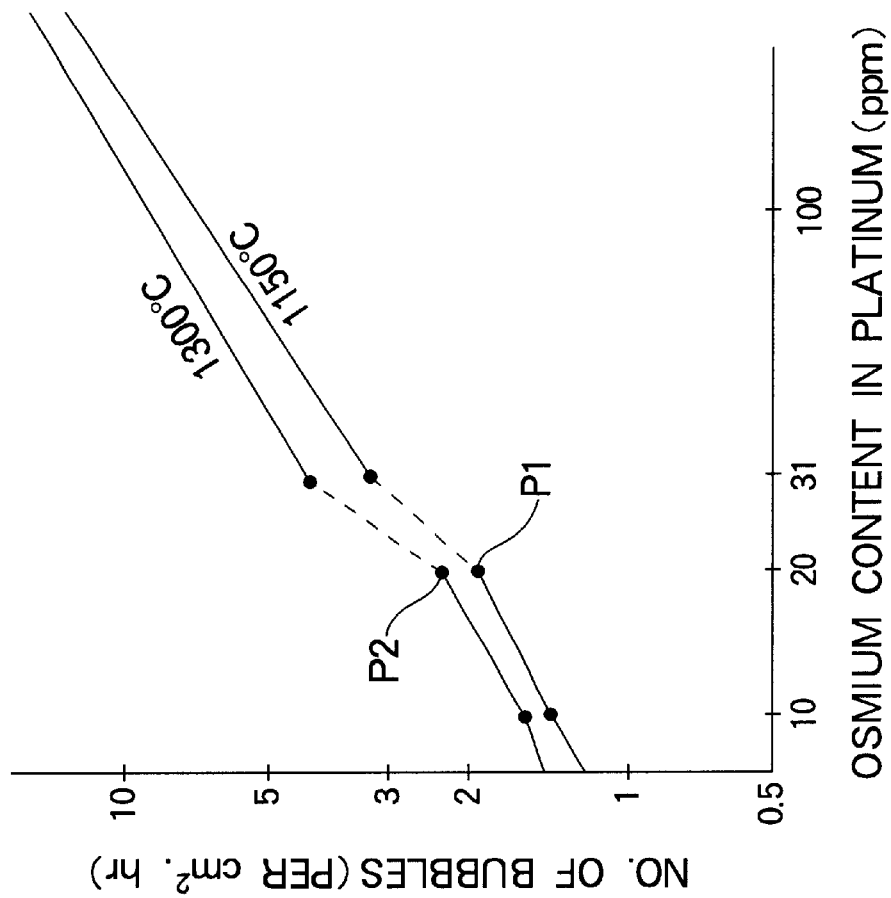
FIG. 1 is a graph showing a relation between the content of osmium in platinum and the number of bubbles.

In FIG. 1, the abscissa represents the content of osmium in platinum heated to 1150° C. and 1300° C. while the ordinate represents the number of bubbles. It is noted that when the osmium content falls in a range from 20 ppm to 31 ppm, the number of bubbles reaches a limit intolerable to product quality. This means that the formation of bubbles can be suppressed if the upper limit of osmium content is set at 20 ppm with allowance, as indicated by dots P1 and P2.

Figure 2:
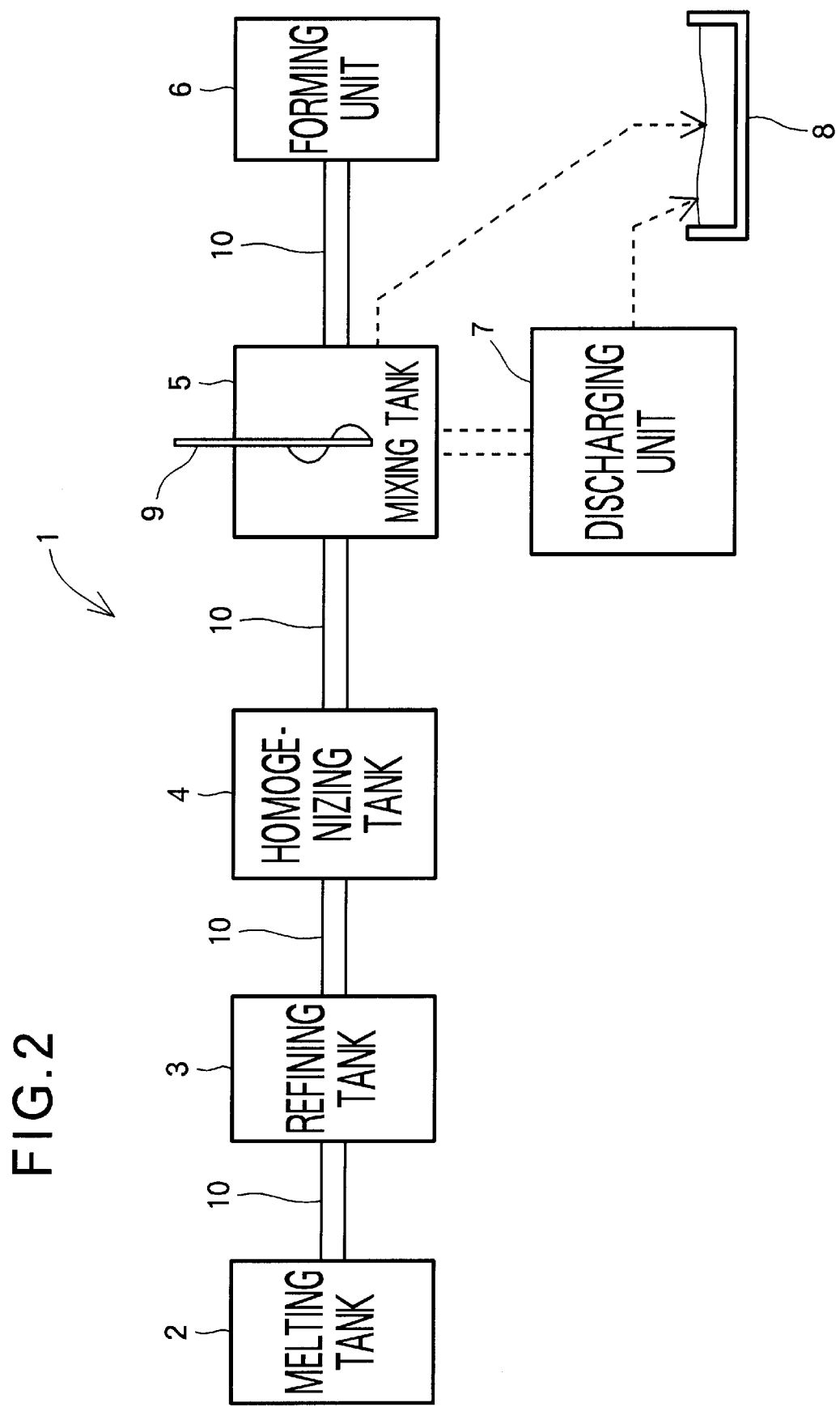
FIG. 2 is a schematic diagram showing the general arrangement of a glass melting furnace and glass forming mold according to the present invention.

FIG. 2 shows a glass melting furnace 1 according to the present invention. The glass melting furnace 1 consists of a melting tank 2, a refining tank 3, a homogenizing tank 4, a mixing tank 5, and a forming unit 6, which are arranged in the order mentioned. They are internally lined with a platinum- or platinum-alloy-based material according to the present invention. The platinum-based lining material will be explained later. The lining of the melting tank may be omitted for the economy of installation cost.

The term "platinum alloy" used herein means one which contains rhodium, or one which contains zirconium oxide and calcium oxide. The latter is so-called reinforced platinum of homogeneous dispersion type.

Glass raw materials are melted in the melting tank 2.

In the refining tank 3, the molten glass fed from the melting tank 2 are freed of bubbles and dissolved gas therein by means of a fining agent added to the glass raw materials.

The homogenizing tank 4 holds the fined molten glass therein, with or without cooling, so that it has a uniform temperature throughout.

In the mixing tank 5, the molten glass is stirred (at a uniform temperature) so as to prevent cords. Designated by reference numeral 9 is a platinum stirrer.

The forming unit 6 gets the molten glass made into a sheet glass by drawing.

These steps are carried out sequentially and continuously in a glass melting furnace 1.

Bubbles are possible throughout the steps and removed by the refining tank 3 (which is originally designed for refining) if they are formed in the melting tank 2 and the refining tank 3. However, they usually remain unremoved if they are formed thereafter in the homogenizing tank 4, mixing tank 5, forming unit 6, discharging unit 7, and glass forming mold 8. This is avoided in the present invention by lining with platinum or platinum alloy at least a rear facility, namely, homogenizing tank 4, mixing tank 5, forming unit 6, discharging unit 7, and glass forming mold 8.

For the refining tank 3 to carry out refining easily, the number of bubbles formed in the melting tank 2 and refining tank 3 should preferably be as small as possible. To this end, it is desirable to line the melting tank 2 and refining tank 3 with platinum or platinum alloy which hardly evolves bubbles.

In other words, the present invention is characterized in that the entire facility or the rear facility (homogenizing tank 4 and succeeding installations) are lined with platinum or platinum alloy which hardly evolves bubbles. In the latter case, the cost of equipment can be somewhat saved.

If requirements for quality associated with bubbles and cords are not so stringent, the homogenizing tank 4 may be omitted or the melting tank 2 and refining tank 3 may be combined together.

As shown in FIG. 2, the molten glass passed through the mixing tank 5 goes directly to the glass forming mold 8 where it is made into molded glass, or indirectly to the glass forming mold 8 through the discharging unit 7.

It is desirable that platinum or platinum alloy (specified in the present invention as the lining material for glass melting furnaces) be used also for the connectors 10 joining the melting tank 2, refining tank 3, homogenizing tank 4, mixing tank 5, and forming unit 6 together sequentially.

The glass raw materials are incorporated with fining agents such as arsenic oxide, antimony oxide, tin oxide, barium chloride, barium sulfate, and calcium chloride, which remain in the molten glass.

The above-mentioned glass melting furnace 1 can treat glass of any composition, such as aluminoborosilicate glass, aluminosilicate glass, and alkali-free glass (containing substantially no alkali, like alkali-free aliminosilicate glass). They have a higher strain point than soda lime silica glass for building window glazing.

The glass melting furnace 1 of the present invention can treat adequately electronic glass (such as a substrate for a liquid crystal display) and substantially alkali-free aluminoborosilicate glass which are required to be free of bubbles almost completely.

It is also suitable for melting and forming optical glass (including waveguides, optical lenses, and optical fibers) of the above-mentioned composition, whose specification for bubbles per unit volume is not so stringent as that for LCD substrates.

EXAMPLES

Five experiments as explained below were conducted to demonstrate that the platinum or platinum alloy specified in the present invention hardly evolves bubbles.

(1) Laboratory experiment with test pieces of LCD glass.
(2) Laboratory experiment with test pieces of optical glass.
(3) Test on an actual glass melting furnace shown in FIG. 2.
(4) Test on an actual glass melting furnace shown in FIG. 2.
(5) Purification of platinum.

Experiment 1

Glass raw materials: as per composition shown in Table 2.
Platinum crucible: 200 ml in capacity, made of platinum bullion free of osmium as impurities (not detectable by emission spectroscopic analysis with a detection limit of ca. 1 ppm).
Melting temperature: 1600° C.
Melting time: 3 hours
Refining temperature: 1600–1650° C.
Glass sample: disc, about 70 mm in diameter and about 5 mm thick, cast onto a clean stainless steel board.

TABLE 2

| | mol % |
|---|---|
| Glass composition | |
| $SiO_2$ | 67.4 |
| $B_2O_3$ | 11.0 |
| $Al_2O_3$ | 10.0 |
| MgO | 1.0 |
| CaO | 5.7 |
| SrO | 2.0 |
| BaO | 2.7 |
| $As_2O_3$ | 0.2 |
| Total | 100.0 |
| Glass characteristics | |
| $\alpha_{100-300° C.}$ ($10^{-7}$/deg) | 37 |
| Strain point (° C.) | 650 |
| Viscosity at 1500° C. (poise) | $<10^{-3}$ |

Platinum plates: Six samples were prepared from platinum bullion containing different amounts of osmium (1.0, 10.3, 20, 31, 976, 7460 ppm), determined by emission spectroscopic analysis.

A glass sample cut to 1 cm square was placed on the platinum plate and heated at 1050° C., 1150° C., 1200° C., 1250° C., 1300° C., or 1600° C. for 1 hour. It was examined for bubbles formed during heating by means of a high-temperature microscope equipped with a video recorder.

Figure 3B:
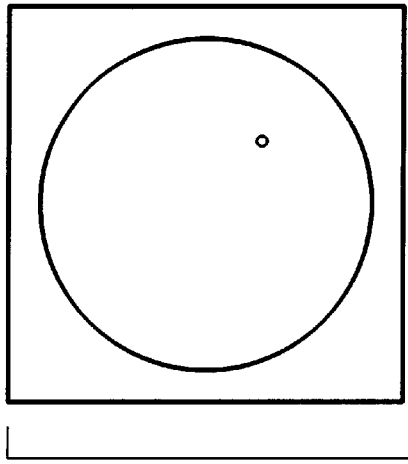
FIGS. 3A and 3B are schematic representations showing bubbles in glass samples.
Figure 3B:
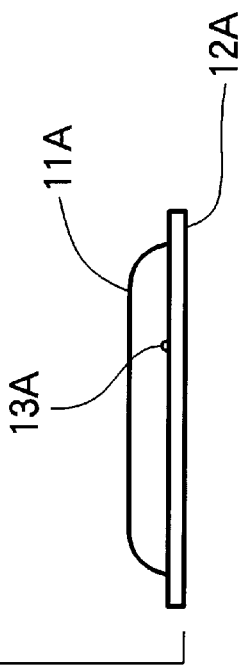
Figure 3A:
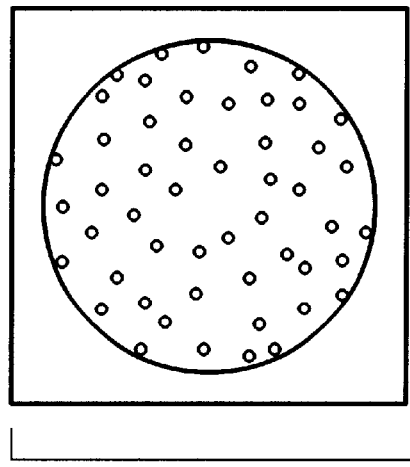
Figure 3A:
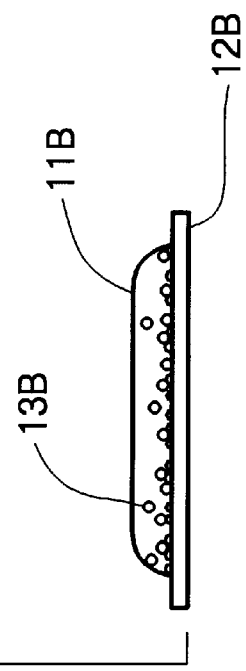

FIGS. 3A and 3B show, in top plan and side elevation, the glass samples containing bubbles. FIG. 3A shows the glass sample which had been heated at 1300° C. on a platinum plate containing 1 ppm osmium. FIG. 3B shows the glass sample which had been heated at 1300° C. on a platinum plate containing 7460 ppm osmium.

In these figures, there are shown glass samples 11A and 11B, platinum plates 12A and 12B, and bubbles 13A and 13B. It is to be noted that there is only one bubble in FIG. 3A while there are many bubbles in FIG. 3B.

Table 3 below shows the results of Experiment 1 in terms of the number of bubbles formed during heating per hour per unit area ($cm^2$) of the platinum plate.

TABLE 3

| Heating Temperature | Content of osmium in platinum | | | | | | Viscosity of glass (poise) |
|---|---|---|---|---|---|---|---|
| | 1.0 ppm | 10.3 ppm | 20 ppm | 31 ppm | 976 ppm | 7460 ppm | |
| 1050° C. | 0 | 0 | 0 | 0.3 | 0.4 | 1.2 | $1.8 \times 10^6$ |
| 1150° C. | 0.4 | 1.4 | 2.0 | 3.2 | 29 | 124 | $1.6 \times 10^5$ |
| 1200° C. | 0.8 | 1.4 | 2.1 | 3.1 | 32 | 137 | $5.4 \times 10^4$ |
| 1250° C. | 0.5 | 1.5 | 2.3 | 2.9 | 34 | 146 | $2.2 \times 10^4$ |
| 1300° C. | 0.7 | 1.6 | 2.3 | 4.1 | 31 | 168 | $9.6 \times 10^3$ |
| 1600° C. | 0.7 | 1.5 | 2.5 | 5.0 | 40 | 229 | $3 \times 10^3$ |

The data in Table 3 are partly graphed in FIG. 1. It was found from FIG. 1 that the number of bubbles increases with the increasing content of osmium in the platinum plate. And, it turned out that bubbles are formed while glass is in contact with platinum at high temperatures if platinum contains osmium as impurities.

Thus, it was confirmed experimentally that an effective way to reduce the number of bubbles is to reduce the content of osmium in platinum as far as possible.

Table 3 above also shows the viscosity of glass (in poise) in the rightmost column. It is noted that the higher the temperature, the greater the number of bubbles and the lower the viscosity. This means that more bubbles are formed as the viscosity decreases. This in turn suggests a certain relation between viscosity and bubble formation.

It is considered that bubbles move (rise) very slowly in molten glass of high viscosity and hence new bubbles are hardly formed, whereas bubbles in molten glass of low viscosity easily move (rise), permitting new bubbles to be formed one after another.

Figure 4:
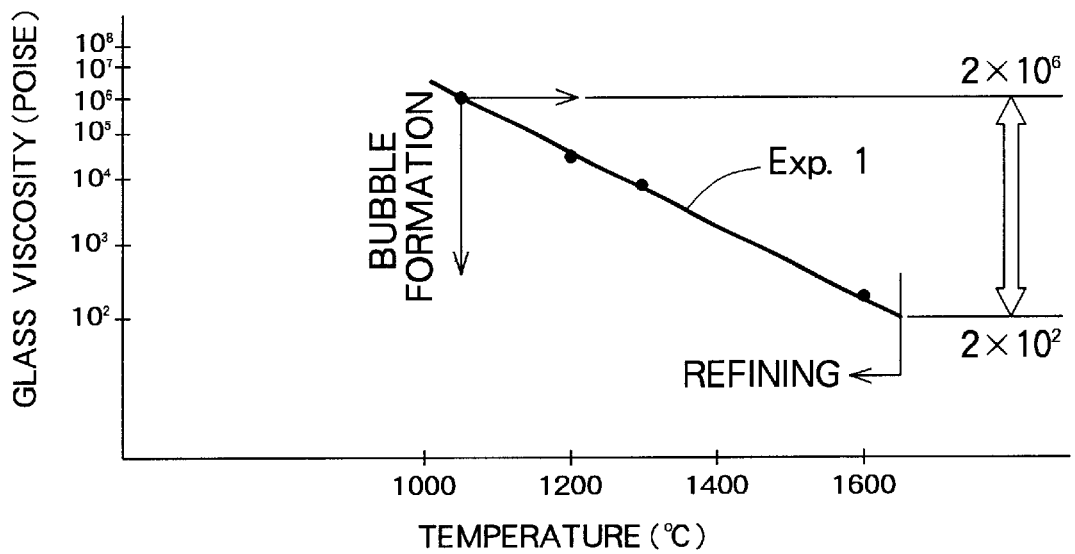
FIG. 4 is a graph showing a relation between the glass temperature and the glass viscosity in Experiment 1.

Data in the rightmost column of Table 3 are graphed in FIG. 4, with glass viscosity (on ordinate) plotted against temperature (on abscissa).

Table 3 indicates that no bubbles are formed at 1050° C. if the osmium content is no more than 20 ppm but bubble formation starts at 1050° C. if the osmium content is more than 20 ppm.

This is signified by an arrow (marked "bubble formation") at 1050° C. in FIG. 4.

Similarly, an arrow marked "refining" appears at 1650° C. in FIG. 4, because this temperature is the highest in the entire process. Recall that the temperature is 1500–1650° C. in the refining tank, 1500° C. in the homogenizing tank, 1500° C. in the mixing tank, and 1150–1200° C. in the forming unit.

White arrow in FIG. 4 indicates the range of viscosity ($2 \times 10^2$ to $2 \times 10^6$ poise) in which the formation of bubbles is likely. If platinum containing osmium no more than 20 ppm, preferably no more than 10 ppm, is used for the molten glass having a viscosity in this range, then it would be possible to suppress the formation of bubbles. Conversely, using platinum with a low osmium content for the molten glass having a viscosity outside the above-mentioned range is not effective in suppressing bubbles but is uneconomical.

Experiment 2

Glass raw materials: as per composition shown in Table 4.
Platinum crucible: 200 ml in capacity, made of platinum bullion free of osmium as impurities (not detectable by emission spectroscopic analysis with a detection limit of ca. 1 ppm).
Melting temperature: 1350° C.
Melting time: 3 hours
Refining temperature: 1350–1400° C.
Glass sample: disc, about 70 mm in diameter and about 5 mm thick, cast onto a clean stainless steel board.

TABLE 4

|  | mol % |
|---|---|
| Glass composition | |
| $SiO_2$ | 72.6 |
| $B_2O_3$ | 11.0 |
| BaO | 0.6 |
| $Na_2O$ | 7.8 |
| $K_2O$ | 7.9 |
| $As_2O_3$ | 0.1 |
| Total | 100.0 |
| Glass characteristics | |
| $\alpha_{100-300°\ C.}$ ($10^{-7}$/deg) | 89 |
| Strain point (° C.) | 546 |
| Viscosity at 1500° C. (poise) | $<10^2$ |

Platinum plates: Six samples were prepared from platinum bullion containing different amounts of osmium (1.0, 10.3, 20, 31, 976, 7460 ppm), determined by emission spectroscopic analysis.

A glass sample was placed on the platinum plate and heated at 750° C., 800° C., 900° C., 1000° C., 1200° C., or 1400° C. for 1 hour. It was examined for bubbles formed during heating by means of a high-temperature microscope equipped with a video recorder. Observations were the same as shown in FIGS. 3A and 3B.

Table 5 below shows the results of Experiment 2 in terms of the number of bubbles formed during heating per hour per unit area ($cm^2$) of the platinum plate.

TABLE 5

| Heating Temperature | Content of osmium in platinum | | | | | | Viscosity of glass (poise) |
|---|---|---|---|---|---|---|---|
|  | 1.0 ppm | 10.3 ppm | 20 ppm | 31 ppm | 976 ppm | 7460 ppm |  |
| 770° C. | 0 | 0 | 0 | 0 | 0 | 0 | $1.5 \times 10^7$ |
| 810° C. | 0 | 0 | 0.1 | 0.2 | 0.5 | 1.3 | $2.2 \times 10^6$ |
| 870° C. | 0.2 | 1.1 | 1.6 | 2.8 | 30 | 127 | $1.3 \times 10^5$ |
| 940° C. | 0.4 | 1.3 | 2.0 | 3.2 | 33 | 131 | $1.6 \times 10^4$ |
| 1080° C. | 0.4 | 1.7 | 2.3 | 3.7 | 35 | 163 | $1.0 \times 10^3$ |
| 1300° C. | 0.5 | 1.8 | 3.0 | 4.8 | 41 | 221 | $2 \times 10^2$ |
| 1400° C. | 0.5 | 1.9 | 2.9 | 5.0 | 43 | 230 | $7 \times 10$ |

Figure 5:
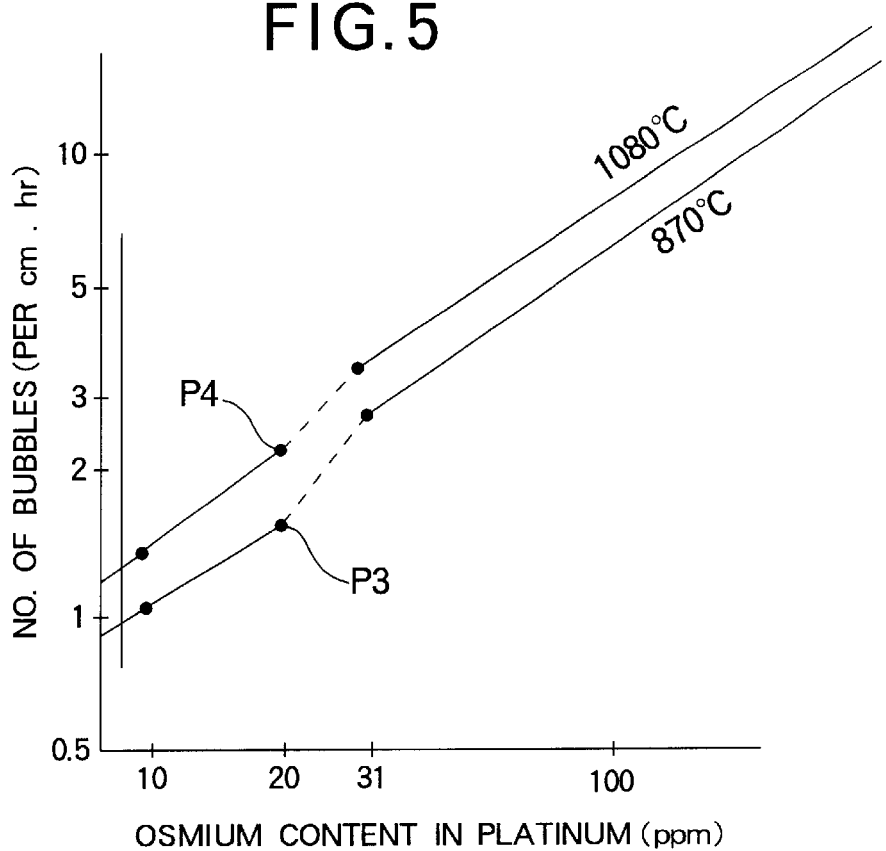
FIG. 5 is a graph showing a relation between the content of osmium in platinum and the number of bubbles in Experiment 2.

The data in Experiment 2 (at heating temperatures of 870° C. and 1080° C.) are graphed in FIG. 5, with the abscissa representing the osmium content and the ordinate representing the number of bubbles formed. It is noted that when the osmium content falls somewhere in the range from 20 ppm to 31 ppm, the number of bubbles reaches a limit intolerable to product quality. This suggests that the formation of bubbles is suppressed if the upper limit of osmium content is set at 20 ppm with allowance, as indicated by dots P3 and P4.

It was found from Experiment 2 (FIG. 5) that the upper limit of the osmium content should be 20 ppm, preferably 10 ppm, as in the case of Experiment 1 (FIG. 1).

Figure 6:
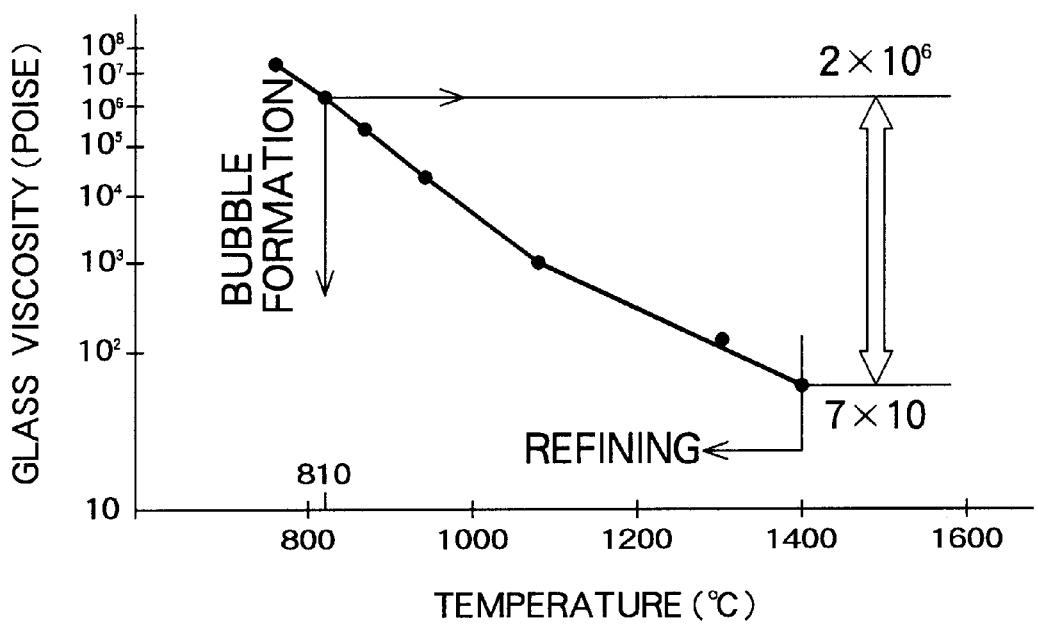
FIG. 6 is a graph showing a relation between the glass temperature and the glass viscosity in Experiment 2.

The data in the rightmost column of Table 5 are graphed in FIG. 6, with glass viscosity (on logarithmic ordinate) plotted against temperature (on abscissa).

Table 5 indicates that no bubbles are formed at 810° C. if the osmium content is no more than 10.3 ppm but bubble formation starts at 810° C. if the osmium content is more than 20 ppm.

This is signified by an arrow (marked "bubble formation") at 810° C. in FIG. 6.

Similarly, an arrow marked "refining" appears at 1400° C. in FIG. 6, because this temperature is the highest in the entire process. Recall that the temperature is 1350–1400° C. in the refining tank, 1300° C. in the homogenizing tank, 1200° C. in the mixing tank, and 1050° C. in the forming unit.

White arrow in FIG. 6 indicates the range of viscosity ($7 \times 10$ to $2 \times 10^6$ poise) in which the formation of bubbles is likely. If platinum containing osmium no more than 20 ppm, preferably no more than 10 ppm, is used for the molten glass having a viscosity in this range, then it would be possible to suppress the formation of bubbles. Conversely, using platinum with a low osmium content for the molten glass having a viscosity outside the above-mentioned range is not effective in suppressing bubbles but is uneconomical.

The way to suppress the formation of bubbles by controlling the temperature of molten glass would vary depending on the glass composition, whereas the way to suppress the formation of bubbles by controlling the viscosity of molten glass would be the same regardless of the glass composition.

It is known from FIG. 6 that in the case of optical glass having a viscosity of $7 \times 10$ to $2 \times 10^6$ poise the formation of bubbles is effectively and economically suppressed if platinum containing less than 20 ppm osmium, preferably less than 10 ppm osmium, is used as the lining material for the glass melting furnace.

The formation of bubbles in optical glass (in FIG. 6) can be suppressed as a matter of course if the viscosity of the optical glass is in the range of $2 \times 10^2$ to $2 \times 10^6$ poise as in the case of LCD glass (in FIG. 4) for which the formation of bubbles can be suppressed effectively and economically if its viscosity is in the same range as above.

Consequently, the formation of bubbles can be suppressed in any kind of glass so long as the viscosity is in the range of $2 \times 10^2$ to $2 \times 10^6$ poise and the osmium content is less than 20 ppm, preferably less than 10 ppm.

Incidentally, the above-mentioned two kinds of glass exhibit their lowest viscosity at temperatures corresponding to their refining temperatures.

To see if the results of the above-mentioned Experments 1 and 2 (laboratory tests) are applicable to actual operation, Experiment 3 with actual equipment was conducted.

Experiment 3

Glass raw materials: as shown in Table 2 or the same one as in Experiment 1.
Equipment: as shown in FIG. 2. Platinum specified below is used for lining the refining tank, homogenizing tank, mixing tank, forming unit, and connectors (excluding the melting tank).
Platinum: containing as impurities 20 ppm osmium, 4 ppm arsenic, and 5 ppm iridium.
Melting tank: heated by natural gas and electric booster at about 1600–1650° C. to melt continuously fed glass raw materials.
Refining tank: heated by natural gas and electric booster at about 1600° C. to effect fining with the aid of $As_2O_3$ incorporated into glass raw materials.
Homogenizing tank: electrically heated at about 1500° C.
Mixing tank: stirred by platinum stirrers at 1500° C.
Forming unit: designed to form sheet glass about 1000 mm wide and 0.7 mm thick.

During operation from beginning, the resulting sheet glass was examined as to the number of bubbles therein per unit weight. It took about five days for the number of bubbles to decrease from 10 per kg to 1 per kg.

After that, the number of bubbles decreased further to a constant value of 0–0.3 per kg. This value indicates that the sheet glass is satisfactory for use as an LCD substrate glass.

The results of Experiment 3 revealed that platinum containing 20 ppm osmium contributes to the production of high-quality glass products with very few bubbles.

It is concluded from the results of Experiments 1 and 3 that the content of osmium in platinum should preferably be no more than 10 ppm to reduce the number of bubbles.

Experiment 4

For comparison with Experiment 3, this experiment was conducted using platinum of industrial grade containing 50 ppm osmium.

The glass melting and forming equipment used in this experiment is identical in structure and scale with the one used in Experiment 3. Continuous sheet glass (about 1000 mm wide) was produced and cut to size. The composition of glass raw materials is shown in Table 2.

The refining tank and the forming unit were lined with platinum which contains as impurities 50 ppm osmium, 4 ppm arsenic, and 6 ppm iridium.

During operation from beginning, the resulting sheet glass was examined for the number of bubbles therein per unit weight. It took about one month for the number of bubbles to decrease from about 100 per kg to 1 per kg. After that, the number of bubbles did not decrease any more.

This means that Experiment 4 took six times as long warming-up period as Experiment 3 (five days).

The short warming-up period as in Experiment 3 is economically advantageous in view of the fact that the life of platinum (in contact with molten glass at high temperatures in the refining tank and forming unit) is usually shorter than one year (depending on operating conditions).

Experiments 3 and 4 are intended to verify Experiment 1 by actual operation. It was confirmed that Experiment 2 is also applicable to actual operation although explanation is omitted here.

The foregoing demonstrates that the lining material for the glass melting furnace should be platinum or platinum alloy containing osmium no more than 20 ppm, preferably no more than 10 ppm.

Experiment 5

This experiment is intended for purification of platinum as a lining material for glass melting furnaces.
Size of sample: 30×30×1.2 mm
Material of sample: platinum
Osmium content: 30 ppm
Apparatus for purification: electric furnace
Duration of purification: 100 hours and 360 hours A sample of platinum containing 30 ppm osmium was heated in an electric furnace at 1600° C. or 1700° C., and the content of osmium in it was determined at certain intervals.

Figure 7:
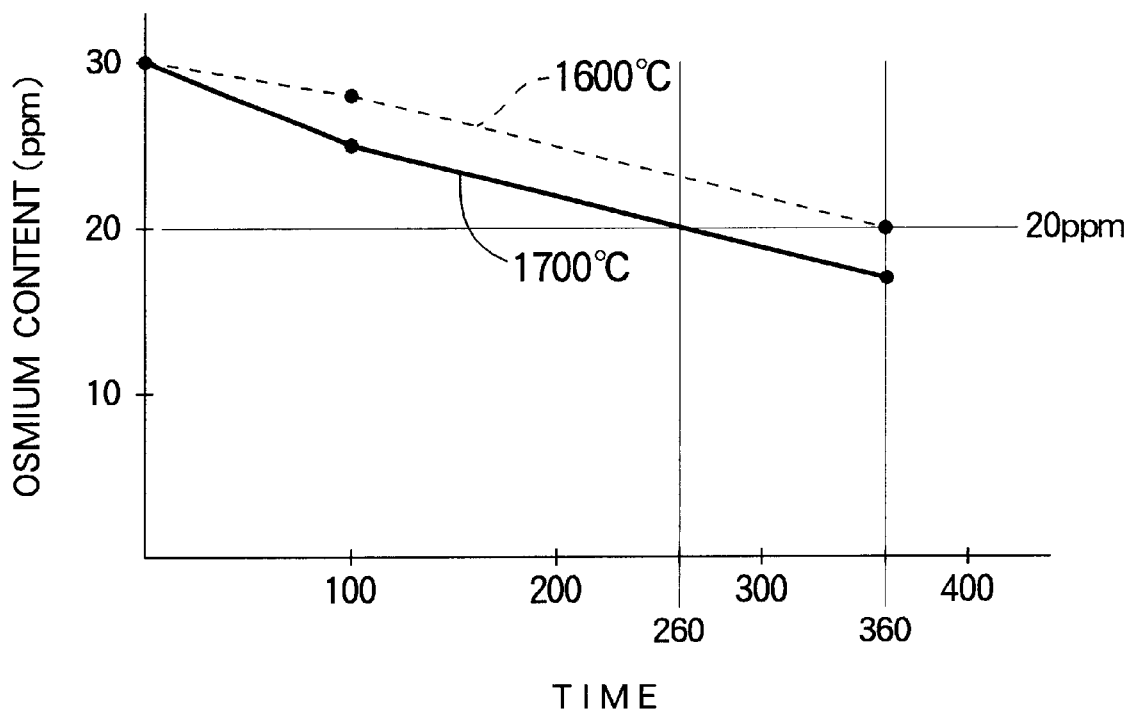
FIG. 7 is a graph showing changes in osmium contents with time.

In the graph of FIG. 7, the content of osmium (ordinate) is plotted against time (abscissa).

It is noted that in the case of heating at 1600° C., it took 360 hours for the osmium content to decrease to 20 ppm (desired value), whereas in the case of heating at 1700° C., the osmium content decreased to 20 ppm within 260 hours and to 17 ppm within 360 hours.

In other words, in the latter case, decreasing the osmium content by 10 ppm took 260 hours (11 days) by heating at 1700° C. and 360 hours (15 days) by heating at 1600° C.

Osmium in platinum is usually present in the form of metal. Upon heating in an oxidizing atmosphere, osmium in the surface layer of platinum changes into osmium oxide ($OsO_4$), which vaporizes and gets lost at 131° C. (boiling point). Then, osmium diffuses outward from inside and oxidizes in the surface layer.

The continuous and simultaneous diffusion and vaporization result in osmium escaping from platinum. The fact that energy for diffusion is much greater than energy for vaporization is a conceivable reason that the higher the heating temperature, the shorter the period required for treatment (purification).

Assuming that industrial platinum contains osmium in a maximal amount of 84 ppm (as shown in Table 1 above), it is necessary to decrease the osmium content by 64 ppm (from 84 ppm to 20 ppm). Time required to achieve this object would be simply calculated at 70 days (11 days multiplied by 6.4) in the case of heating at 1700° C. or 96 days (15 days multiplied by 6.4) in the case of heating at 1600° C.

The same effect as above is obtained by heating at 1500° C. or 1400° C. if the length of heating time is doubled. Therefore, heating at 1600° C. or 1700° C. is desirable to save time for purification, as shown in Experiment 5.

An alternative to purifying purchased platinum or platinum alloy as mentioned above is to purchase platinum or platinum alloy which is almost free of osmium, because the supplier of platinum bullion can eliminate osmium in the stage of refining.

The process of the present invention is suitable for the production of electronic glass to be free of bubbles almost completely. The absence of bubbles leads to high transparency and undistorted images.

The process of the present invention is suitable particularly for the production of LCD substrate glass. The absence of bubbles eliminates the possibility of circuit breakage.

The process of the present invention is also suitable for the production of alkali-free aluminoborosilicate glass. The absence of bubbles leads to high transparency and undistorted images.

It is apparent that the formation of bubbles can be prevented if the platinum or platinum alloy specified in the present invention is used for lining that part of the glass melting furnace or glass forming unit which comes into contact with molten glass. Whether to line the facility entirely or partly is at one's discretion.

Obviously, various minor changes and modifications of the present invention are possible in the light of the above teaching. It is therefore to be understood that within the scope of the appended claims the present invention may be practiced otherwise than as specifically described.

What is claimed is:

1. A process for producing glass products, comprising the steps of: refining molten glass in a refining tank; homogenizing the molten glass from said refining tank at a predetermined uniform temperature in a homogenizing tank; and forming the molten glass from said homogenizing tank into a sheet glass in a forming unit, said refining tank being lined, at least at a wall thereof in contact with the molten glass, with a lining material for glass melting furnaces, which comprises one of platinum and platinum alloy as a base material which include osmium in an amount no more than 20 ppm, so that said wall evolves no bubbles during refining, said homogenizing tank being lined, at least at a wall thereof in contact with the molten glass, with a lining material for glass melting furnaces, which comprises one of platinum and platinum alloy as a base material which include osmium in an amount no more than 20 ppm, so that said wall evolves no bubbles during homogenization, said forming unit being lined, at least at a wall thereof in contact with the molten glass, with a material for glass melting furnaces, which comprises one of platinum and platinum alloy as a base material which include osmium in an amount no more than 20 ppm, so that said wall evolves no bubbles during forming.

2. A process for producing glass products, as defined in claim 1, wherein the content of osmium is no more than 10 ppm.

3. A process for producing glass products, as defined in claim 1, further comprising the step of melting glass in a melting tank prior to the refining step, said melting tank being lined, at least at a wall thereof in contact with the molten glass, with a lining material for glass melting furnaces, which comprises one of platinum and platinum alloy as a base material which include osmium in an amount no more than 20 ppm, so that said wall evolves no bubbles during melting.

4. A process for producing glass products, as defined in claim 3, wherein the content of osmium is no more than 10 ppm.

5. A process for producing glass products, as defined in claim 1, further comprising the step of mixing the molten glass in a mixing tank prior to the forming step, said mixing tank being lined, at least at a wall thereof in contact with the molten glass, with a lining material for glass melting furnaces, which comprises one of platinum and platinum alloy as a base material which include osmium in an amount no more than 20 ppm, so that said wall evolves no bubbles during mixing.

6. A process for producing glass products, as defined in claim 5, wherein the content of osmium is no more than 10 ppm.

7. A process for producing glass products, as defined in claim 1, wherein the glass products are those for electronic parts.

8. A process for producing glass products, as defined in claim 7, wherein the glass products for electronic parts are glass substrates for liquid crystal displays.

9. A process for producing glass products, as defined in claim 7, wherein the glass products for electronic parts are substantially alkali-free aluminoborosilicate glass.

10. A process for producing glass products, as defined in claim 2, wherein the glass products are those for electronic parts.

11. A process for producing glass products, as defined in claim 10, wherein the glass products for electronic parts are glass substrates for liquid crystal displays.

12. A process for producing glass products, as defined in claim 10, wherein the glass products for electronic parts are substantially alkali-free aluminoborosilicate glass.

13. A process for producing glass products, as defined in claim 1, wherein the molten glass is prepared such that its viscosity does not exceed $2 \times 10^6$ poise.

14. A process for producing glass products, as defined in claim 1, wherein the molten glass is prepared such that its viscosity does not fall below $2 \times 10^2$ poise.

15. A process for producing glass products, as defined in claim 13, wherein the molten glass is prepared such that its viscosity does not fall below $7 \times 10$ poise where the glass products are optical glass products.

16. A process for producing glass products, as defined in claim 14, wherein the content of osmium is no more than 10 ppm.

17. A process for producing glass products, as defined in claim 15, wherein the content of osmium is no more than 10 ppm.

* * * * *